May 10, 1966 P. P. W. VARLET 3,250,640
PROCESS FOR MANUFACTURING REINFORCED POLYESTER RESIN SHEETS
Filed June 8, 1964 3 Sheets-Sheet 1

INVENTOR
PIERRE PAUL WILLIAM VARLET

BY
ATTORNEY

INVENTOR
PIERRE PAUL WILLIAM VARLET

United States Patent Office 3,250,640
Patented May 10, 1966

3,250,640
PROCESS FOR MANUFACTURING REINFORCED
POLYESTER RESIN SHEETS
Pierre Paul William Varlet, Asnieres, Seine, France, assignor to Societe Anonyme des Usines Chausson, Asnieres, Seine, France, a company of France
Filed June 8, 1964, Ser. No. 373,483
Claims priority, application France, Feb. 25, 1960, 819,600
13 Claims. (Cl. 117—62.2)

This application is a continuation-in-part of copending application Serial No. 90,629, filed February 21, 1961, now abandoned.

This invention relates to a novel method for the manufacture of reinforced plastic sheets and plates and to the products obtained thereby. More particularly, the invention concerns a method of preparing sheets and plates either per se or by impregnation of a layer of reinforcing material with a thermosetting type of polyester resin, the resin being first partially polymerized to a gel state, and subsequently fully polymerized by heat and pressure.

In my prior copending application Serial No. 214,523, filed August 3, 1962, there was disclosed a novel process for the manufacture of reinforced plastic sheets or plates having a smooth and nonadherent surface, and adapted to be shaped or stamped into any desired object, utilizing mechanical operations similar to those employed for shaping steel sheets or plates. These mechanical operations included, for example, the use of stamping machines or folding presses, which heretofore could not be successfully employed on synthetic resin sheets or plates.

In the aforementioned prior application, it was also disclosed that the work on sheets or plates by shaping tools was facilitated when the surfaces of these sheets or plates were coated with lubricants, such as certain waxes. In the course of subsequent tests, it was observed that the shaping of sheets and plates was sometimes difficult owing to the absolute incompressibility of these sheets or plates, which necessitated the application of high pressures to the stamping tools. Moreover, the surface or skin condition of the end products was not always perfect. It was noticed that these defects were principally due to the fact that the resins brought to the preliminary partially polymerized or gel state for shaping could not absolutely flow between the shaping tools, because the gel polymer was too hard.

In accordance with the present invention, this disadvantage is obviated by controlling the hardness of the gel polymers obtained, so that the products to be shaped therefrom can be provided for in accordance with the complexity of the shaping operation by which they are to be manufactured.

The method of the invention comprises the steps of making articles from polyester resins by first preparing the resins in the form of a stable gel, stable at ambient temperature. The gel, which is a partial polymer, is obtained by the action upon the resin, to which a polymerization catalyst has previously been added, of a polymerization moderator. The polymerization moderator comprises a solution of a reducing metal salt, such as, for example, a stannous or ferrous salt, in a suitable organic solvent therefor. The action of the polymerization moderator, taken with that of the polymerization catalyst which is already present, brings about a limited primary reticulation of the resin, causing the resin to pass into the gel state. The solvent in the polymerization moderator also serves to modify the accelerating action of the reducing metal salt. The gel resin thus obtained is then treated with an agent, such as a mercaptan, which imparts to the resin a surface skin which is in a more advanced state of polymerization.

Various other aspects of the invention will become apparent as the ensuing description proceeds.

In accordance with the preferred practice of the invention, the method of the invention comprises the steps of first impregnating a supporting layer of a permeable reinforcing material with a thermosetting polyester resin which forms the body of the plastic sheet or plate, together with a polymerization catalyst therefor. The support or reinforcement is prepared from sheets of fabric or fiber, or from sheets or plates made, for example, from paper or other suitable material, which may be natural or synthetic.

This support is impregnated with the resin and polymerization catalyst, together with the aforementioned solution of polymerization moderator. Alternatively, the support may first be impregnated with the solution of the polymerization moderator, and then with the resin-catalyst mixture. Other agents for special purposes, as explained more fully below, may also be added at this stage.

The invention will be better understood by reference to the accompanying drawings, in which.

Figure 1:
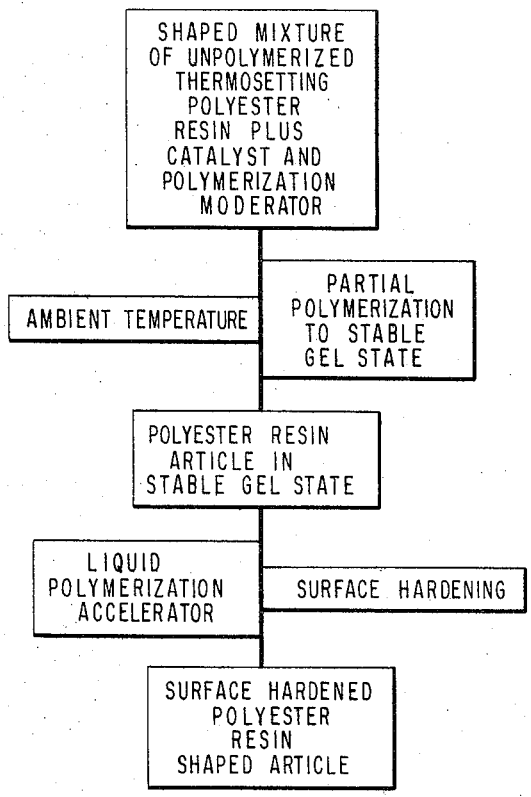
FIG. 1 is a flowsheet depicting the manufacture of a shaped unsupported polyester resin article.
Figure 2:
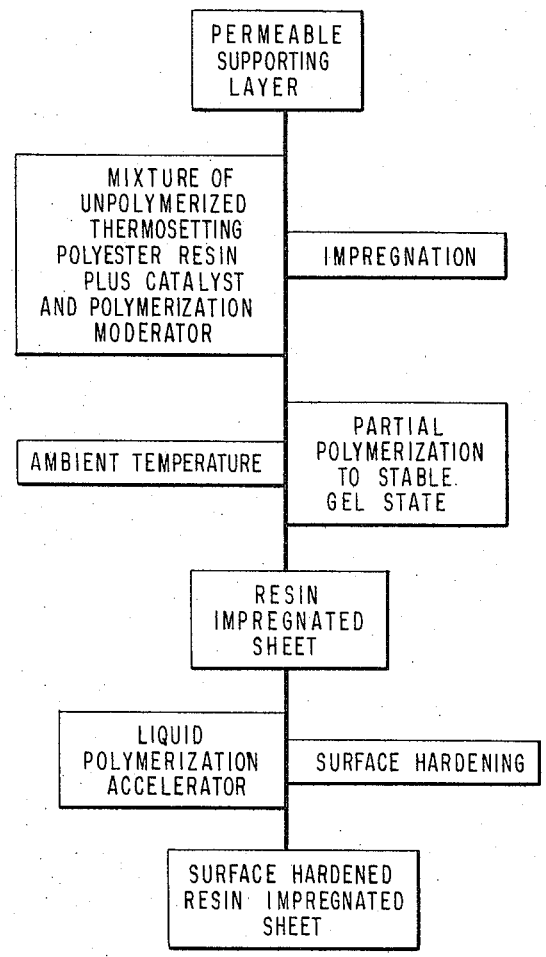
FIG. 2 is a flowsheet of the preferred method of impregnating a supporting layer to form a sheet.
Figure 3:
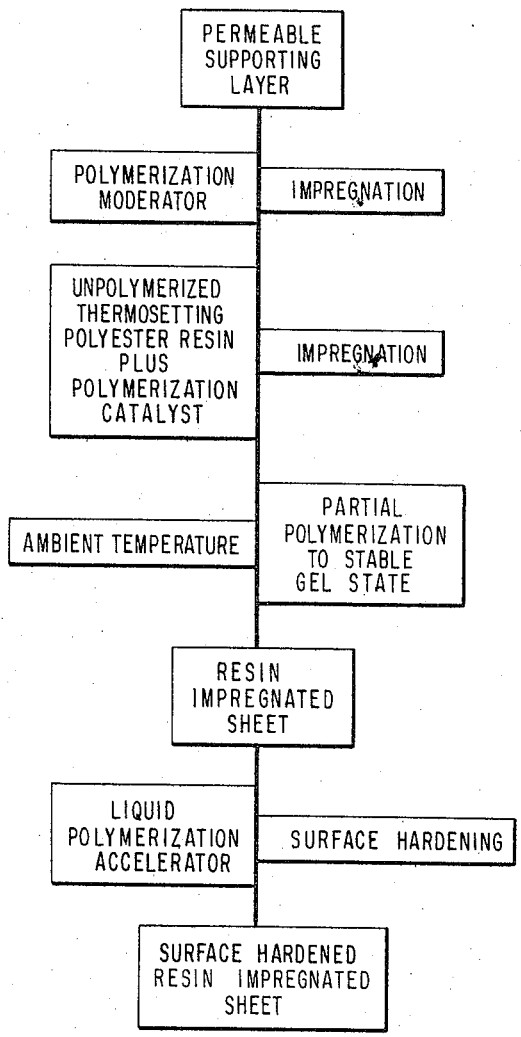
FIG. 3 is a flowsheet of the alternative method of impregnating a supporting layer to form a sheet.

As employed herein, the expression "polyester resin" signifies a class of thermosetting synthetic resins produced by the esterification of polybasic organic acids with polyhydric alcohols. The esterifying acids may be unsaturated, for example, maleic acid, or they may include acids such as phthalic acid or terephthalic acid, or other acids, in addition to the unsaturated polybasic acid.

Polyester resins which are capable of being put into a partially polymerized gel state, and which are suitable for use in the novel method of the invention, include those obtained by copolymerization of unsaturated alkyd resins, products of polycondensation of unsaturated dicarboxylic acids and cross-linked divalent alcohols with vinyl or allyl monomers, or the esters of allyl alcohol with cross-linked monobasic or polybasic acids with or without the inclusion of vinyl monomers. This type of polyester resin includes those resulting from the polycondensation of two or more of the following acids and alcohols and comonomers:

Acids:
  Maleic acid
  Maleic anhydride
  Adipic
  Sebacic
  Fumaric
  Chlormaleic
  Succinic
  Tetrachlorphthalic
  Lauric
  Ricinoleic
  Caproic
  Hexachlorendomethylene-tetrahydrophthalic
  Endomethylene-tetrahydrophthalic Alcohols:
  Ethylene glycol
  Diethylene glycol
  Propylene glycol
  Polypropylene glycol
  Glycerol
  1,2-butanediol
  1,3-butanediol
  1,4-butanediol
  Trimethylolypropane Comonomers:
- Styrene
- Acrylonitrile
- Methylstyrene
- Methyl acrylate
- Methyl methacrylate
- Vinyl acetate
- Esters of allyl alcohol, e.g. phthalates, adipate, maleate, cyanurate These resins are formed of liquid or semi-liquid polymerizable components which polymerize together, in what is known as the oil phase, without splitting off a by-product, e.g. water, to form, ultimately, hard resins. Usually this reaction is expedited by the use of an oxygen-containing polymerization catalyst, such as benzoyl peroxide and other organic peroxides; temperatures of about 150° C. are usually required for rapid polymerization. In accordance with the invention, by employing the polymerization moderator, a partial polymerization or gelation which can be stopped at a desired degree of viscosity can be produced, i.e. the resin is brought to a gel state of hardness for which the article is able to be mechanically shaped, i.e. in a stamping press. Subsequently, the polymerization is resumed and rapidly completed during shaping of the article in a brief period of time of, e.g. 15 to 20 seconds. In accordance with another aspect of the invention, a subsequent treatment is provided which has the effect of bringing the surfaces of the sheets or plates to a sufficient state of polymerization so that these surfaces are nonadherent.

Specific thermosetting polyester resin compositions which are suitable for use in the process of the invention are shown in the following formulations, which are to be regarded as illustrative, and not as limiting:

Composition 1: Unsaturated polyester resin obtained by baking together:

| | Moles |
|---|---|
| Ethylene glycol | 5 |
| Maleic anhydride | 2.5 |
| Adipic acid | 0.5 |
| Phthalic anhydride | 2 |

100 parts by weight of the foregoing composition, after baking, may be incorporated with 35 parts of methylstyrene.

Composition 2:

| | Moles |
|---|---|
| Ethylene glycol | 5 |
| Propylene glycol | 1 |
| Maleic acid | 3 |
| Phthalic anhydride | 2 |

100 parts by weight of the foregoing composition, after baking, are incorporated with, for example, 33 parts by weight of styrene.

Composition 3:

| | Moles |
|---|---|
| Ethylene glycol | 4 |
| Propylene glycol | 1 |
| Maleic acid | 3 |
| Phthalic anhydride | 1.8 |
| Lauric acid | 0.2 |

The lauric acid is added at the end of the baking process. 100 parts by weight of the foregoing mixture may be incorporated with 33 parts by weight of styrene.

The polyester resin with which the permeable layer is impregnated contains any suitable type of polymerization catalyst for this class of resin, preferably an oxidizing or free radical type of catalyst, such as, for example, a peroxide type catalyst, e.g. benzoyl peroxide. The resin may also have incorporated therein suitable fillers, pigments, and the like.

The purpose of the polymerization catalyst is to cause completion of the polymerization of the resin in the final stage of the process, and the catalyst is generally one which will have no activity or a negligible activity in connection with the first change of state of the resin, although it may exhibit a slight activity. The catalyst is intended to facilitate the polymerization of the resin at the final working of the sheet or plate.

The impregnation of the treated permeable layer can be carried out by means of rollers, doctor blades, spraying, or with suitable presses. The sheet can also be calendered to any desired thickness. The sheet may also be subjected to any desired surface treatment to modify its surface structure.

In accordance with the invention, in order to provide better control of the gel formation, there may be added to the resin, in addition to the polymerization catalyst, a polymerization moderator, comprising a reducing metal salt and a solvent therefor. The reducing metal salt, such as a stannous or ferrous salt, is simple to use and does not affect the qualities, particularly the color, of the polyester resin. The distribution of the metal salt must obviously be uniform, so that the resin brought into contact therewith are homogeneously treated. Examples of reducing metal salts are stannous chloride, $SnCl_2$, and ferrous chloride, $FeCl_2$.

The action of the reducing metal salt, e.g. stannous chloride, being an accelerating one, it is desirable to modify this action and to control is to that the resin is not immediately completely polymerized, but on the contrary, the polymerization is interrupted at a predetermined rate, depending upon subsequent utilization of the resin. For control of the reticulation rate of the resin treated with the reducing metal salt, the metal salt is placed in solution or suspension for the purpose of contacting the reisn or the reinforcing layer.

Where the resin must have a relatively hard consistency, it has been found advantageous to place the reducing metal salt in solution in furane, or a furane derivative, such as tetrahydrofurane. When, on the other hand, the resins must have the consistency of a viscous jelly able to flow but nevertheless having good consistency, the reducing metal salt is dissolved in formamide, or a derivative thereof, such as, for example, dimethylformamide.

For resin gels with intermediate degrees of hardness, the reducing metal salt is dissolved in dioxane or furfurol. With the latter carrier, the gel is particularly soft and flows easily, an advantage for several purposes.

By putting the reducing metal salt in solution or suspension in combinations or mixtures of the various solvents mentioned above, it is easily possible to obtain exactly the hardness sought for the gel stage resin, and this hardness can also be adjusted by utilizing, in addition to the solvents mentioned, auxiliary solvents, such as ethylene glycol and derivatives thereof, especially those having one or more ether functions.

In order to provide better control, there may be added to the resin, additionally to the catalyst, a polymerization inhibiting agent to act as a preservative or protector for the sheets or plates in which the resin is in the partially polymerized stage. Examples of suitable polymerization inhibiting agents are alkylated phenols, such as 4-methyl-2,6-di-tertiarybutyl-phenol, or dibutyl tertiary-p-cresol. These may be applied in the form of a solution in an organic solvent, for example, a 6% solution in styrene.

The support is impregnated by dipping into a solution of the polymerization moderator including a volatile solvent such as alcohol, draining and drying, and then impregnating with the polyester resin, in which a polymerization catalyst has been previously incorporated. The aforementioned polymerization inhibitor may also be included. Alternatively, the polymerization moderator is incorporated with the resin and catalyst and inhibitor. The fluidity of the mass thus obtained can, if desired, be increased by subjecting it to mixing to facilitate impregnation of the supporting layer.

The resulting gel state resin impregnations remain stable for a very long time, but can be polymerized to completion by the action of heat or other means. For this purpose, the prepared sheets or plates in the unpolymerized stage are advantageously heated to a temperature not in excess of about 120° C., preferably about 100° C. but the temperature is not critical. The sheets are maintained at this temperature for a period of time which depends on the desired thickness and rigidity of the gel, as well as upon the hardness of the skin that is formed on the surface of the sheets. After heating, the sheet is cooled to stabilize the gel formed by the resin. Sheets formed in this way can be stored by placing them on top of one another without the necessity of providing interlayers. The gel stage sheets can be handled and processed in a manner similar to that used for steel sheets, i.e. by stamping and shaping operations preferably carried out with heating tools, so that complete polymerization of the sheets may take place while they are being worked.

The following examples, which are to be regarded as illustrative and not as limiting, describe the practice of the invention:

*Example 1*

A polyester resin composition was prepared having the following ingredients:

| | |
|---|---|
| The polyester resin designated Composition 1, above, grams | 100 |
| Benzoyl peroxide, grams | 2 |
| Calcium carbonate filler, grams | 30 |
| 6% solution of 4-methyl-2,6-ditertiary butyl-phenol in styrene, cc. | 1 |
| Solution of 1 gram stannous chloride in 4 cc. of tetrahydrofurane, cc. | 0.8 |

After mixing at 21° C., the mass was allowed to stand. It was noticed that its temperature progressively rose, reaching 25° C. at the end of 7 minutes, at which time the mass had the consistency of an extremely viscous jelly and the temperature remained stationary during about 20 minutes. After that, the temperature dropped again, finally reaching the ambient value of 21° C. The consistency of the gel remained constant, and did not alter on storage for 3 weeks at 21° C.

*Example 2*

A glass fiber support having a surface of 1 sq. meter was employed as a permeable base. The support weighed 320 grams. The support was impregnated with a solution of 1 gram of stannous chloride in 4 cc. of tetrahydrofurane, diluted with a small amount of ethyl alcohol. The impregnated support was dried completely to eliminate the alcohol diluent. The support was then impregnated further with the resin components of Composition 1, benzoyl peroxide, and calcium carbonate, and polymerization inhibitor as described in Example 1—namely, 100 grams of the polyester resin designated Composition 1, above, 2 grams of benzoyl peroxide, 30 grams calcium carbonate filler, and 1 cc. of a 6% solution of 4-methyl-2,6-ditertiarybutyl phenol in styrene. The impregnated support was allowed to stand until the resin coating became a partially polymerized gel, and the surface was then hardened by applying dimethylaniline. The gel coated support was baked between two metal plates at 70° C. for 2½ hours at a pressure of 100 grams per sq. cm., and then cooled to 30° C.

*Example 3*

Runs similar to those of Example 2 were made by impregnating the supports with solutions of stannous chloride in dimethylformamide, in dioxane, and in furfurol, all with small additions of alcohol. Thereafter the several impregnated supports were further impregnated with the resin, catalyst and inhibitor mixture of Example 1. The results obtained were similar, i.e. in all cases resin gels were obtained the consistencies of which were exactly comparable to the consistency of the gel obtained directly, as in Example 1. The supports impregnated with the resin in the gel state are not easy to handle owing to the viscosity of the gels, and hence they were further treated with a surface or skin treating agent, as described below, said treatment having the effect of rendering the surfaces of the prepared sheets or plates nonadherent.

*Example 4*

A polyester resin composition was prepared from the following ingredients.

| | |
|---|---|
| The polyester resin designated Composition 2, above, grams | 100 |
| Benzoyl peroxide, grams | 2 |
| Calcium carbonate filler, grams | 30 |
| 6% solution of 4-methyl-2,6-ditertiarybutyl-phenol in styrene, cc. | 1 |
| Solution of 1 gram stannous chloride in 4 cc. of dimethylformamide, cc. | 0.8 |

The ingredients were mixed, allowed to stand at a temperature of 21° C. At the end of 11 minutes, the temperature reached 24° C. and the mass assumed a relatively thick appearance. As in Example 1, the temperature remained steady for about 20 minutes before progressively dropping, the gel remaining stable with no apparent alteration.

*Example 5*

A polyester resin composition was prepared from the following ingredients:

| | |
|---|---|
| The polyester resin designated Composition 3, above, grams | 100 |
| Benzoyl peroxide, grams | 2 |
| Calcium carbonate filler, grams | 30 |
| 6% solution of 4-methyl-2,6-ditertiarybutyl-phenol in styrene, cc. | 1 |
| Solution of 1 gram stannous chloride in 4 cc. dioxane, cc. | 0.8 |

In this example, a maximum temperature of 23° C. was attained at the end of 25 minutes, and a gel was obtained which although viscous, had only slight consistency.

As mentioned above, the sheets or plates of gel state resin obtained as described, may be subjected to a treatment with a surface or skin treating agent, in order to harden the surface by polymerization so that the sheets or plates do not adhere. For this purpose there are employed, in accordance with the invention, liquid polymerization accelerators, which may be, for example, organic nitrogen compounds such as an amine or an amide or an isocyanate. Examples of suitable accelerators include mono- or dialkylanilines, such as methylaniline or dimethylaniline, diarylguanidines, such as N,N'-diphenylguanidine, arylene di-isocyanates, such as toluene di-isocyanate, and the like. The foregoing polymerization accelerators, taken alone or in combination, are used in such manner that they act only superficially and do not penetrate into the mass of the sheet or plate. Thus, the surface or skin treatment with the accelerator is carried out by causing the resin impregnated support in the gel stage to pass against coating felts or rolls impregnated with the accelerator.

In accordance with another aspect of the invention, the surface treatment just described can be further improved by employing, either alone or in combination with the mentioned accelerators, fatty mercaptans, particularly lauryl mercaptan. In this manner, in addition to the accelerator action, the lauryl mercaptan leads to the formation of a smooth and nonadherent skin on the surface of the gel, the mercaptan tends to form a greasy coating. In this manner, subsequent work on the product is greatly facilitated, particularly where the sheets of reinforced resin are used in stamping tools, since it avoids the necessity of employing specially highly finished and polished articles, as is usually necessary when the resin impregnated sheets are shaped by stamping.

What is claimed is:

1. Process for the manufacture of shaped polyester resin articles in a partially polymerized and stable state in which the articles are capable of storage and handling without premature hardening, which comprises the steps of forming a shaped mixture of an unpolymerized thermosetting polyester resin, a polymerization catalyst, and a polymerization moderator comprising a solution of a reducing metal salt in an organic solvent, allowing the mixture to remain substantially at ambient temperature until it has attained a partially polymerized gel state, and then hardening the surface of the article by applying to said surface a liquid polymerization accelerator.

2. Process for the manufacture of reinforced polyester resin sheets capable of being shaped mechanically, which comprises the steps of first impregnating a supporting layer of a permeable reinforcing material with a polymerization moderator for polyester resins comprising a solution of a reducing metal salt in an organic solvent, drying, further impregnating said impregnated reinforcing material with a mixture of an unpolymerized thermosetting polyester resin, and a polymerization catalyst therefor, maintaining the supporting layer and resin mixture substantially at ambient temperature until it has attained a partially polymerized and stable gel state in which the sheet is capable of storage and handling without premature hardening, and then hardening the surface of the sheet by applying to said surface a liquid polymerization accelerator.

3. The process of claim 2 in which the impregnated material containing the resin in the partially polymerized gel state is additionally subjected to heat and pressure to cause complete polymerization of the resin.

4. Process for the manufacture of reinforced polyester resin sheets capable of being shaped mechanically, which comprises the steps of impregnating a supporting layer of a permeable resin-forcing material with a mixture of an unpolymerized thermosetting polyester resin, a polymerization catalyst and a polymerization moderator comprising a solution of a reducing metal salt in an organic solvent, maintaining the supporting layer and resin mixture substantially at ambient temperature until it has attained a partially polymerized and stable gel state in which the sheet is capable of storage and handling without premature hardening, and then hardening the surface of the sheet by applying to said surface a liquid polymerization accelerator.

5. The process of claim 1 in which the polymerization moderator is a solution of stannous chloride in an organic solvent therefor.

6. The process of claim 5 in which the organic solvent is selected from the group consisting of tetrahydrofurane, dioxane, furfurol, and dimethylformamide.

7. The process of claim 5 in which the organic solvent includes ethylene glycol.

8. The process of claim 1 in which the resin mixture includes a polymerization inhibiting agent.

9. The process of claim 8 in which the polymerization inhibiting agent is 4-methyl-2,6-di-tertiarybutyl-phenol.

10. The process of claim 1 in which the liquid polymerization accelerator is a member selected from the group consisting of an alkyl aniline, a dialkylaniline, a diarylguanidine, an arylene di-isocyanate, and a fatty mercaptan.

11. The process of claim 10 in which the accelerator is dimethylaniline.

12. The process of claim 10 in which the accelerator is lauryl mercaptan.

13. The process of claim 10 in which the accelerator is a mixture of dimethylaniline and lauryl mercaptan.

References Cited by the Examiner

UNITED STATES PATENTS

| 2,684,305 | 7/1954 | Quinlivan | 117—33 |
| 2,866,722 | 12/1958 | Gensel et al. | 117—62.2 X |
| 2,932,598 | 4/1960 | Henning | 117—76 X |

RICHARD D. NEVIUS, *Primary Examiner.*

JOSEPH B. SPENCER, *Examiner.*